(12) United States Patent
Aasman (10) Patent No.: US 7,281,028 B2
(45) Date of Patent: Oct. 9, 2007

(54) METHOD AND A SYSTEM FOR RETRIEVING DATA OF A DATA NETWORK

(75) Inventor: Jannes Aasman, Leiden (NL)

(73) Assignee: Nederlandse Organisatie Voor Toegepast-natuurwetenschappelijk Onderzoek TNO, Delft (NL)

( * ) Notice: Subject to any disclaimer, the term of this patent is extended or adjusted under 35 U.S.C. 154(b) by 608 days.

(21) Appl. No.: 10/240,337

(22) PCT Filed: Apr. 2, 2001

(86) PCT No.: PCT/EP01/03763

§ 371 (c)(1),
(2), (4) Date: Oct. 1, 2002

(87) PCT Pub. No.: WO01/75666

PCT Pub. Date: Oct. 11, 2001

(65) Prior Publication Data

US 2003/0065737 A1     Apr. 3, 2003

Related U.S. Application Data

(60) Provisional application No. 60/194,014, filed on Apr. 3, 2000.

(30) Foreign Application Priority Data

Apr. 3, 2000   (EP)   .................................. 00201214

(51) Int. Cl.
*G06F 15/16* (2006.01)

(52) U.S. Cl. ...................... 709/203; 709/217; 709/223; 709/227; 709/238

(58) Field of Classification Search ................ 709/203, 709/217, 223, 227, 238
See application file for complete search history.

(56) References Cited

U.S. PATENT DOCUMENTS 5,673,394 A * 9/1997 Fenwick et al. ............ 719/312

(Continued)

OTHER PUBLICATIONS

T.S. Loon et al, "Alleviating the Latency and Bandwidth Problems in WWW Browsing", USENIX Symposium on Internet Technologies and Systems, Dec. 8-11, 1997, pp. 219-230.

(Continued)

*Primary Examiner*—Bunjob Jaroenchonwanit
*Assistant Examiner*—Lan-Dai T Truong
(74) *Attorney, Agent, or Firm*—Michaelson & Associates; Peter L. Michaelson (57) ABSTRACT

A method and a system for speeding up and reducing the latency in retrieving data of a data network (1). The network (1) being of the type from which data can be retrieved as data pages, among others, multi-level data pages from a plurality of data servers (2) and by a plurality of users (6; 16). Users are provided with an editable navigation tool (19) for retrieving data pages from the network (1). Data pages and data page levels retrieved by a user (6; 16) with the aid of the navigation tool (19) are analyzed and stored in a personal proxy (9; 11) associated with the user (6; 16) and featured by a cache memory (10; 12). The cache memory (10; 12) is refreshed by retrieving relevant data pages and data page levels from the data network (1). Data pages and data page levels requested with the aid of the navigation tool (19) are at first instance retrieved from the personal proxy (9, 11) and, if not available, from the data network (1).

20 Claims, 3 Drawing Sheets

U.S. PATENT DOCUMENTS

| | | | |
|---|---|---|---|
| 5,931,904 A * | 8/1999 | Banga et al. | 709/217 |
| 5,933,827 A | 8/1999 | Cole et al. | 707/10 |
| 5,935,207 A * | 8/1999 | Logue et al. | 709/219 |
| 5,963,964 A | 10/1999 | Nielsen | 707/501 |
| 6,026,474 A * | 2/2000 | Carter et al. | 711/202 |
| 6,061,715 A * | 5/2000 | Hawes | 709/203 |
| 6,128,655 A * | 10/2000 | Fields et al. | 709/219 |
| 6,167,437 A * | 12/2000 | Stevens et al. | 709/214 |
| 6,182,133 B1 * | 1/2001 | Horvitz | 709/223 |
| 6,226,642 B1 * | 5/2001 | Beranek et al. | 707/10 |
| 6,240,447 B1 * | 5/2001 | Banga et al. | 709/217 |
| 6,272,534 B1 * | 8/2001 | Guha | 709/216 |
| 6,275,858 B1 * | 8/2001 | Bates et al. | 709/228 |
| 6,282,548 B1 * | 8/2001 | Burner et al. | 707/104.1 |
| 6,286,006 B1 * | 9/2001 | Bharat et al. | 707/100 |
| 6,317,778 B1 * | 11/2001 | Dias et al. | 709/214 |
| 6,324,552 B1 * | 11/2001 | Chang et al. | 715/501.1 |
| 6,385,642 B1 * | 5/2002 | Chlan et al. | 709/203 |
| 6,389,409 B1 * | 5/2002 | Horovitz et al. | 707/2 |
| 6,393,526 B1 * | 5/2002 | Crow et al. | 711/137 |
| 6,421,733 B1 * | 7/2002 | Tso et al. | 709/246 |
| 6,442,598 B1 * | 8/2002 | Wright et al. | 709/217 |
| 6,519,613 B1 * | 2/2003 | Friske et al. | 707/202 |
| 6,519,631 B1 * | 2/2003 | Rosenschein et al. | 709/217 |
| 6,557,026 B1 * | 4/2003 | Stephens, Jr. | 709/203 |
| 6,721,288 B1 * | 4/2004 | King et al. | 370/310 |
| 6,874,017 B1 * | 3/2005 | Inoue et al. | 709/217 |
| 2001/0034814 A1 * | 10/2001 | Rosenzweig | 711/118 |

OTHER PUBLICATIONS

E.P. Markatos et al, "A Top-10 Approach to Prefetching on the Web", Institute of Computer Science, Foundation for Research and Technology—Hellas, Greece, Technical Report 173, Aug. 1996, pp. 1-15.

* cited by examiner

METHOD AND A SYSTEM FOR RETRIEVING DATA OF A DATA NETWORK

CLAIM TO PRIORITY

This application claims the benefit of my U.S. provisional patent application (now abandoned) entitled "A Method and a System for Retrieving Data of a Data Network" filed Apr. 3, 2000, and assigned Ser. No. 60/194,014, which is incorporated by reference herein.

FIELD OF THE INVENTION

The present invention relates to retrieving of data of a data network of the type from which data can be retrieved as data pages, among others multi-level data pages, from a plurality of data servers and by a plurality of users, such as the World Wide Web ("WWW").

BACKGROUND OF THE INVENTION

Modern information networks, such as the Internet and, in particular, the World Wide Web, are data networks using servers to store documents. The servers are interconnected by high-speed data connections. In the WWW, documents are addressed by Uniform Resource Locators ("URL's"). A URL specifies the network support protocol by a prefix in the URL, such as "HTTP" for Hyper Text Transfer Protocol, followed by the host in the data network where the document is stored and the address of the document within that host.

In HTTP data is transmitted to users in a format known as a "page". Under the HTTP the user interface software, known as the "browser", cannot start to display a page until a significant portion of the page has been received. It will be appreciated that the page cannot be fully displayed until the entire page has been received. The delay in displaying a page is referred to as "latency".

Many users of the Internet are connected thereto by relatively slow telecommunication links using a modem and a standard telephone line, for example. The speed with which information is transmitted by commercially available telephone modems is limited to a number of kilobits per second ("kbps") such as 28.8 kbps or 33.6 kbps. This obviously limits the speed with which pages can be transmitted to a user of the WWW.

The tremendous continuing popularity of the WWW has resulted in a steady growth of the number of users. However, access of large numbers of users to a particular server will slow down the speed with which requests for information are processed.

Further, at present, pages of the Internet can be complex and may take up a relatively huge amount of data. Accordingly, the time for retrieving a complete page using a relatively slow data link can be fairly high.

As a result, today many users complain about the slow speed of the WWW. For the greater part, the latency perceived by users is a result of their relatively slow connection to the Internet and the heavy traffic encountered by a server.

An attempt to eliminate delays in receiving pages from the WWW is to make use of caching techniques. That is, currently available browsers for retrieving data pages are arranged to store received pages in a cache memory. That is, if a user asks for a page which has been asked for previously, the browser will retrieve the particular page from the cache memory.

Caching techniques of this type are, however, only useful if the user retrieves a particular page within a short time after having previously retrieved the same. Otherwise, the browser will not retrieve the page from its cache memory but from the WWW, such that the user again will experience the latency problem.

Further, pages on the WWW will be updated on a regular basis, such that a page which will be stored in a cache memory for a longer time age. By retrieving such a page from the cache memory, the user obviously does not receive the latest information of a particular page or page level.

Navigating the WWW is a complicated task for a number of users, despite the plurality of search tools nowadays available. Further, users who are interested in a particular piece of information on a data page or a data page level, in most cases, are less interested in the graphics and other design features of that data page.

It would be desirable to provide a solution to the main top three frustrations of a user when using the Internet, that is the delay or slowness in fetching pages, the difficulty of navigating the data network, and the sometimes redundant complex and cluttered pages.

In an article by T. S. Loon et al. "Alleviating the Latency and Bandwidth Problems in WWW Browsing", Proceedings of the USENIX (the Advanced Computing Systems Association) Symposium on Internet Technologies and Systems, December 8-11, 1997 pages 219-230, among others, filtering of HTTP requests and responses is disclosed, adaptively to varying Quality of Service (QoS), in order to reduce data transmission over bottleneck transmission links.

Invocation of an appropriate filter is accomplished by means of a rules database. The goal of the rules database is to allow adaptive filtering based on dynamic network conditions and data types. Every user has his/her own HTTP request filter and HTTP response filter.

Although this filtering technique may provide a solution to the latency problem experienced by a user in case the data are received via a bottleneck transmission link, the user will still be confronted with the sometimes-redundant complex and cluttered data pages if the transmission link to the www provides a sufficient QoS.

SUMMARY OF THE INVENTION

It is an object of the present invention to provide information from a data network, such as the WWW or Internet, essentially in that the relevant information is displayed at the user equipment almost instantaneously with a mouse-click and independent of the data speed of the transmission link with which the user is connected to a server of the data network.

It is a further object of the present invention to simplify navigation of the data network, in particular navigation as to information in which a user is particularly interested.

A yet further object of the present invention is to allow users to selectively display part of a data page or data page level, without being bored by unnecessary information from cluttered pages.

These objects and others are solved in accordance with the present invention in that there is provided a method for retrieving data of a data network of which data can be retrieved in a data page format, among others a multi-level data page format, from a plurality of data servers, which method comprises the steps of:
(a) providing users with an editable navigation tool for retrieving data pages from the network;
(b) analyzing data pages and data page levels retrieved by a user with the aid of the navigation tool;

(c) storing the retrieved data pages and data page levels in a personal proxy associated with the user, featured by a cache memory;
(d) refreshing the cache memory by retrieving relevant data pages and data page levels from the data network; and
(3) retrieving, with the aid of the navigation tool, data pages and data page levels stored in the personal proxy.

The latency problem or slowness in fetching pages from the data network is addressed by providing a user editable navigation tool in combination with an intelligent personal proxy associated with a user, which is basically a cache memory arranged for storing pages at the location from which the stored pages can be fetched with high speed, that is comparable to retrieving information from a hard disk of a modem personal computer.

The difficulty of navigating a data network such as the WWW or Internet is essentially solved by providing users with an editable navigation tool for retrieving data pages from the network. The navigation tool essentially comprises browser software for retrieving data pages, however especially adapted such that data pages and data page levels retrieved by a user with the aid of the navigation tool are stored in the personal proxy and, if asked for by the navigation tool, are retrieved from the personal proxy.

Different from the prior art discussed above, the user editable navigation to according to the present invention provides, among others, filtering of the data page content independent of the Qos transmission network. That is, also if the transmission link to the Internet is of sufficient quality, the user still may edit or filter the data page content in order not to be bothered by redundant data, for example. It will be appreciated that by reducing the content of the data page to be displayed, even if the transmission link to the WWW is of sufficient quality, the objected instantaneously display of information is even furthermore enhanced.

The problem of dynamically generated pages, that is data pages of which the information content changes very quickly, is encountered by refreshing the personal proxy cache memory from the data network as to the relevant data pages and data page levels retrieved with the navigation tool.

Accordingly, data pages and data page levels retrieved with the aid of the navigation tool in accordance with the present invention, if asked for, are up to date retrieved from a users' personal proxy. Thus, the particular information has not to be retrieved from the data network with all the above-mentioned problems causing the latency in displaying retrieved data pages. With the present invention, the information retrieved through the navigation tool is almost instantaneously available at a mouse-click, more or less only dependent on the speed with which information can be retrieved and displayed internally in a computer, such as a personal computer, by which a user is connected to the data network.

Although the cache memory featuring the personal proxy of a user is, preferably, located at the hard disk of a personal computer of a user, a residential or local network gateway and even a cache memory located with a date network service provider may already improve the speed with which the information in a data page or data page level applied for is provided to a user.

In practice, users of a group of users, such as users within a company having the same or a comparable profession, more of less will have the same interest in data pages relevant to their profession, for example.

Accordingly, data pages and data page levels retrieved by such a group of users can be advantageously stored in a proxy, called a family proxy, accessible to all the users of a group or family. Further, in the case of a family, the use of a family proxy provides an opportunity for parental management, because parents might want to protect their children from a certain type of information available from the WWW or Internet.

In a preferred embodiment of the present invention, the family proxy is comprised of the personal proxies of users associated with a group or family of users. That is, the users may retrieve data pages and data page levels stored in any personal proxy of users belonging to a particular group or family. It will be appreciated that data pages or data page levels stored in a particular personal proxy do not have to be stored again in another personal proxy making up the family proxy. This provides a more efficient use of the totally available cache memory.

In order to keep the personal or family proxy up to date, in an embodiment of the method according to the invention, an average level depth and timing profile of data pages retrieved with the aid of the navigation tool are calculated. The relevant data pages and data page levels are stored and refreshed in the cache memory featuring the personal proxy or family proxy controlled by the timing profile with which the information content of a data page and data page level are dynamically generated. By calculating the average data page level depth, storage and refreshment of data page levels, which are rarely retrieved is avoided, thereby enhancing the overall efficiency of the refreshment process and the occupation of available cache memory.

However, refreshment of the cache memory can also be provided by randomly sampling the pages and page levels and learning by fine-tuning whenever pages or page levels change their information content.

For refreshing or actualizing the content of the personal proxy or the family proxy, it is advantageous if a user continuously connects to the data network, for example by a communication link via the Integrated Services Digital Network ("ISDN"), an ASDL ("Asymmetrical Digital Subscriber Line") link, or a data link via a Cable Television network ("CaTV"), for example.

An intelligent personal proxy or family proxy is, in accordance with an embodiment of the method of the invention, arranged for analyzing data pages and data page levels retrieved by a user with the aid of the navigation tool, for storing the retrieved data pages and data page levels in the cache memory featuring the personal proxy, and for refreshing of the personal proxy and provision of the data pages and data page levels applied for with the aid of the navigation tool from the personal or family proxy.

It has been proven that a navigation tool taking the form of a navigation tree is an easy to use and understandable navigation mechanism compared to the more complicated browsers which are currently available.

The navigation tree, in a preferred embodiment of the invention, comprises a first list of data categories or main-categories, such as news, shopping, people, sports, etc. Further, each data category may comprise a second list of multi-level data pages also called top-level links. For example, the main-category "news" may comprise a second list of multi-level data pages referring to the BBC, CNN, New York Times, and The Washington Post etc. It will be appreciated that other categories and top-level links can be envisaged.

By having the navigation tree user editable, each user may configure the navigation tree in order to fit optimally to his or her interest profile or favorite data pages.

In a preferred embodiment of the invention, which makes the use of the navigation tree very comfortable, the second list is comprised of icons taking the form of an arbitrary part of a particular data page, to be selected by the user. Advantageously, a user can select any part of a data page which is best referring or appealing to a user in association with the relevant data page.

When the user first starts up, he or she will receive a general navigation tree, which mayor may not depend on particular characteristics of a user. That is, a user heavily interested in sports may receive a general navigation tree however, adapted to data pages particularly involved in providing information of sports events.

By making navigation trees of users available within the data network, users may benefit from the work of other users in preparing a particular navigation tree. This is beneficially for users which are not so experienced in navigating the data network, i.e. the Internet or WWW, which receive in this manner an easy to handle navigation tool, thereby simplifying the retrieval of relevant data pages of the data network.

By analyzing the navigation tree as to the content of and frequency with which data pages and data page levels are retrieved, suggestions can be derived for individual users in order to enhance or amend the content of their individual navigation tree. Such suggestions may be received from a separate editorial board or from a network service provider, for example. Providing such suggestions is a very promising new service for data network service providers. As will be appreciated, the service of providing suggestions for enhancing or amending the navigation tree may also be implemented on a basis that users can ask for the most referred to data pages in a particular data category.

Further, the network service provider may perform a type of pre-fetching of the top most requested data pages of all its users, i.e. equipped with or without a special navigation tool in accordance with the present invention. This, in order to also quickly retrieve requested-data pages not already earlier asked for by a personal or family proxy.

For new data pages or top-level links, a default caching strategy can be adopted, for example, storage of two levels of such data pages. The most advantageous starting point at first start up of a user is to provide a general navigation tree, which optionally can be based on certain characteristics of the user.

By applying filter tools, such as filters for amending data pages in that graphics, colors, frames, background information or others are ignored, for example, a user can be freed from unnecessary information enclosed by a data page. Such filters or page re-writing mechanisms may be prepared in advance and made be available for incorporating into a navigation tree of a user and tailored to his/her needs by the user.

Likewise, filters designed by a particular user can be made available to all the users of the data network, in accordance with an embodiment of the invention, for incorporating in the navigation tree of the individual users.

The navigation tool can be provided by a network service provider as a novel service for its users.

The present invention further provides a system arranged for operating in accordance with the novel and inventive method disclosed above.

BRIEF DESCRIPTION OF THE DRAWINGS

The above and other objects and advantages of the invention will be further elucidated by the following description, taken in conjunction with the accompanying drawings, in which like reference numerals refer to like parts throughout, and in which.

DETAILED DESCRIPTION OF THE PREFERRED EMBODIMENTS

Although the present invention is generally applicable for retrieving data from any data network capable of providing data as multi-level pages from a plurality of data sources, without the intention of a limitation, the invention will now be disclosed in further detail with reference to the Internet, and in particular to the World Wide Web ("WWW").

Figure 1:
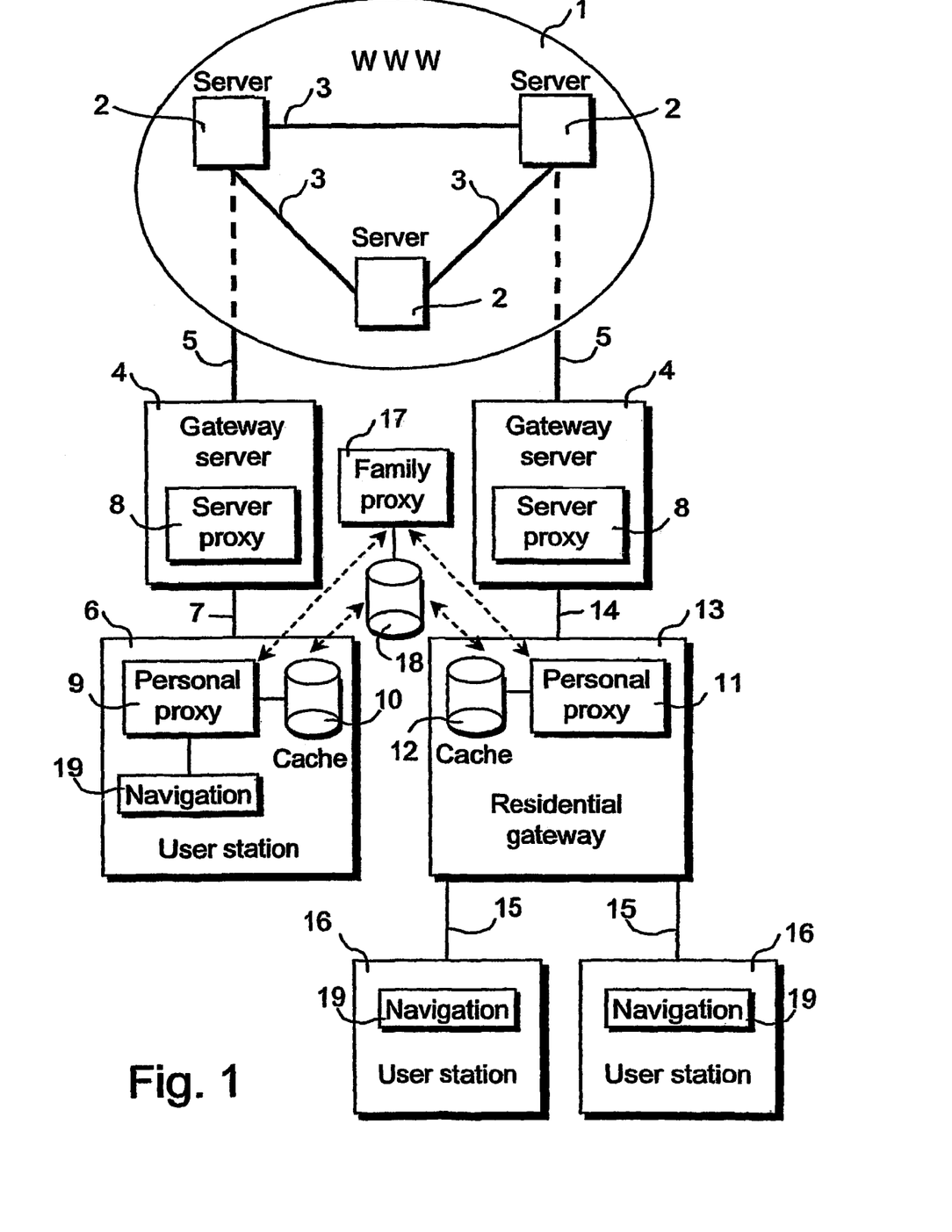
FIG. 1 is a schematic block diagram of a system arranged to operate following the method according to the present invention.

As schematically shown in FIG. 1, the WWW architecture 1 comprises a plurality of servers 2 positioned all over the globe The servers 2 are interconnected by high speed data communication links 3.

Access to the WWW 1 is provided by network gateways, such as gateway servers 4. The gateway servers 4 connect by permanent high-speed data links 5 to a server 2 of the WWW 1.

Users connect to a gateway server 4 with their user station 6, like a personal computer, for example. The communication link 7 between a user station 6 and the gateway server 4. is, in many cases, a low speed data communication link such as a wired or wireless telephone line. Data over such a telephone line is transferred-using telephone modems (not shown) having a data transmission speed of 28.8 kilobits per second ("kbps") or 33.6 kbps, for example.

Instead of directly accessing a gateway server 4, users may also connect to a local or residential gateway 13, such as the user stations 16. The residential gateway 13 connects by a data link 14 to a gateway server 4. The data link 14 preferably is of the type providing continuous access to the WWW 1 via the gateway server 4. The user stations 16 may connect by a low or medium rate data link 15 to a residential gateway 13. The data link 15 may be of the type providing continuous access to the residential gateway 13, such as an Integrated Services Digital Network ("ISDN") or an Asymmetrical Digital Subscriber Line ("ADSL") link, for example. Those skilled in the art will appreciate that the data link 7 between a user station 6 and a gateway server 4 may also be of the type providing a continuous "on" connection to the WWW 1.

The communication software by which a user station communicates with WWW servers is called a "browser". WWW browser software is designed to communicate with a so-called proxy 8 at the gateway server 4, hereinafter referred to as "server proxy". In practice, the gateway server 4 is operated by a network service provider, such as an Internet Service Provider ("ISP").

The server proxy 8 operates as an intermediate between the browser software of the user station 6 and a WWW server 2.

WWW browser software is designed to communicate data in pages and may comprise a plurality of page levels. The main page is also called a top-level link, and the page levels are referred to as sub-level links or branches.

In accordance with the present invention a further proxy 9, 11, hereinafter referred to as "personal proxy", is associated with users of the WWW 1.

In the embodiment shown, the personal proxy 9 is established by software at a user station 6 and featured by cache memory 10 in the user station 6. The cache memory 10 may comprise a hard disk or any other storage medium available on a personal computer, for example, for reading and writing data pages.

The personal proxy 11 is established by software at the residential or local network gateway 13, and is featured by a cache memory 12 available with or connected to the gateway 13. Likewise, the cache memory 12 may comprise a hard disk or any other storage medium for storage and retrieval of data pages.

In accordance with the present invention, a plurality of personal proxies 9, 11 may form a common proxy hereinafter referred to as "family proxy" 17, schematically indicated by dashed arrows. The family proxy 17 is featured by a cache memory 18 comprised of the cache memories 10, 12 of the individual personal proxies 9, 11 as indicated by dashed arrows.

It will be appreciated that a family proxy may reside in a single user station 6 of which several members of family have access to. Further, a family proxy 17 may be established by a group of users in a company, office and the like, or users having a common interest profile with regard to the information to be retrieved from a data network, such as the Internet.

Following the present invention, users are provided with an editable navigation tool 19 in the form of software running on their user station 7-6, 16. The navigation tool 19 is designed for retrieving data pages of the www 1 and operates in connection with users' personal proxy 9, 11 and/or family proxy 17.

For the purpose of clarity, software and control and peripheral equipment such as a monitor CRT or liquid crystal display device, a keyboard, a mouse and the like, required for the operation of the servers 2, the gateway servers 4, the user stations 6, 16 and the residential or local network gateway 13, are not shown. This software and control equipment is generally known to those skilled in the art and, in the context of the present invention, needs no further explanation.

Figure 2:
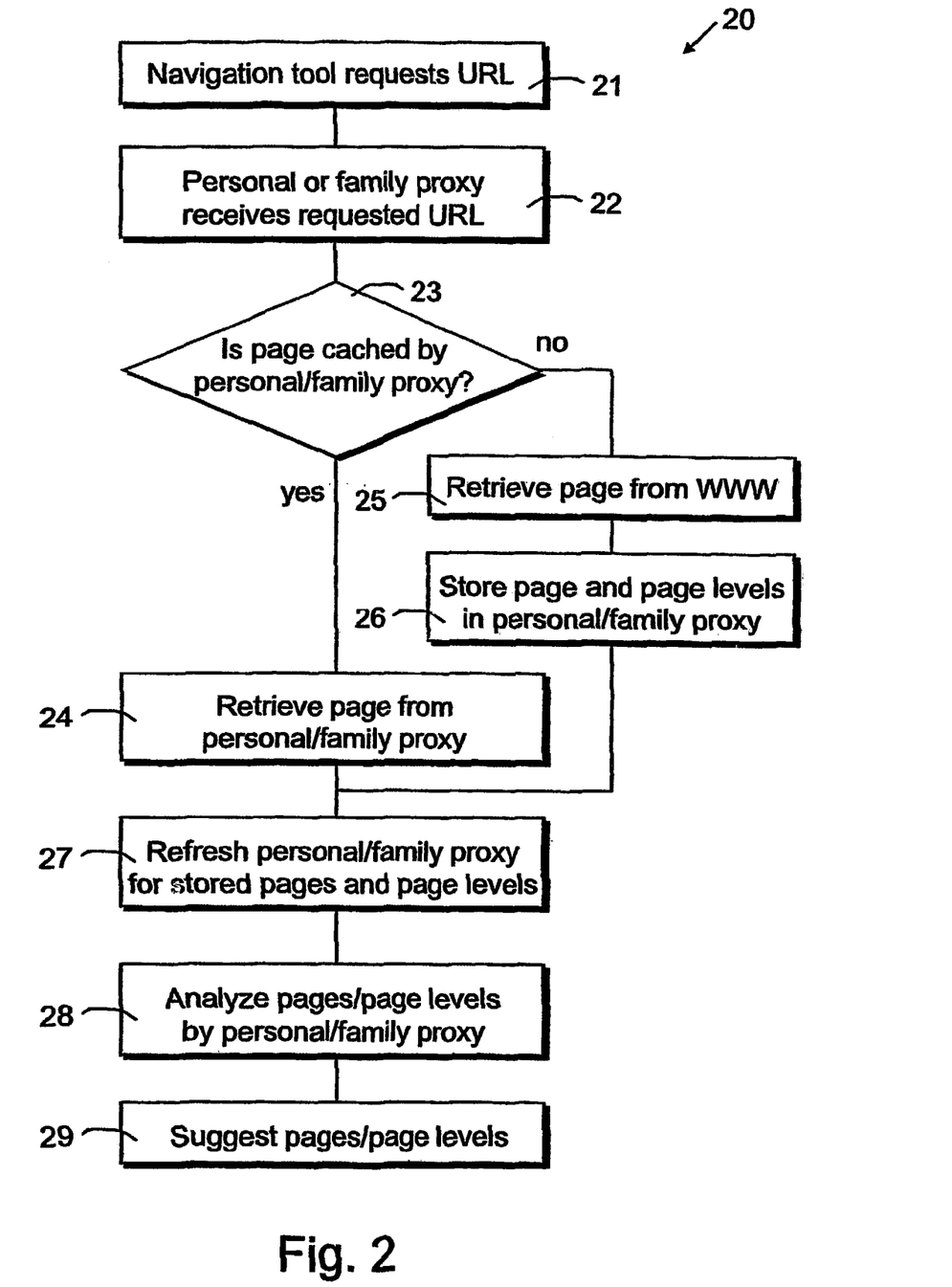
FIG. 2 is a schematic flow chart diagram of a portion of the method of the present invention.

The operation of the method of the present invention will now be disclosed with reference to the flow chart diagram 20 of FIG. 2.

For navigating the WWW 1, with the aid of the navigation tool 19 resident in a user station 6, 16, a user provides a URL ("Uniform Resource Locator") identifying a particular page of a site to be retrieved from the WWW 1, as indicated at step 21.

At step 22, the relevant personal proxy 9, 11 or the family proxy 17, whatever applicable, receives the request and analyzes same to see if the requested page is stored in its cache memory 10, 12 or 18, respectively, as indicated at step 23. If available, the relevant page or page-level will be retrieved from the personal proxy 9, 11 or the family proxy 17, and displayed at the users' monitor, as shown at step 24. In this case, because the information is available from a personal or family proxy 9, 11, 17, in particular if the cache memory 10, 12, 18 featuring the relevant proxy resides in the user station 7 or connects thereto with a direct cable link, for example, the requested page is available and will be displayed almost instantaneously with the click of the mouse by which the page is requested. No latency will be experienced by the user. Page requests which can be directly served from a personal proxy or family proxy 9, 11, 17 will not form a processing load for the gateway servers 4 and the WWW 1, such that the overall efficiency of the network 1 is greatly improved.

Only if the page is not available from the personal or family proxies 9, 11, 17, it will be retrieved from the WWW 1 through the relevant gateway server 4, as shown at step 25. In this case, the personal proxy or family proxy 10, 12, 17, stores the relevant top-level page and, if applicable, some of the sub-level pages thereof, i.e. step 26.

As indicated at step 27, the personal proxies 9, 11 or the family proxy 17 are arranged, in accordance with the present invention, for automatically updating or refreshing the stored data pages and page levels. Preferably, the proxies 9, 11, 17 have a continuous connection to the WWW 1, such that pages which are dynamically generated are kept autonomously up to date. It will be appreciated that refreshing on a regular or interval basis is, of course, also possible.

The frequency at which the whole or part of the content of a personal or family proxy 9, 11, 17 is refreshed, in a preferred embodiment of the invention, is derived from the average timing by which pages are retrieved. That is, pages which are seldom retrieved will be updated less frequently than pages which are very frequently applied for. Likewise, the level depth of a page stored by the personal or family proxy depends on the average level depth of the pages retrieved. In accordance with the present invention, this type of analyses may be applied by the personal or family proxy 9, 11, 17, but also by a network service provider such as an ISP, as shown at step 28.

From this analysis, suggestions may be derived and provided to other users for updating their navigation tool 19 by an ISP or other service company, for example, step 29. To this end, the content of the individual navigation tools 19 may be made public to all the other users of an ISP, for example, or otherwise made available for general use. At first start up of a user, a start navigation tool may be provided, based on certain characteristics of a user. This start navigation tool will automatically update itself to the user preferences derived from the manner in which he or she surfs the data network.

From the above, it will be clear that the present invention is essentially based on a combination of a user editable navigation tool 19 and a personal or family proxy 9, 11, 17, which adapts its information content to the information retrieved with the aid of the navigation tool 19. Surfing a data network is extremely enhanced by the present navigation tool in that the information, which is frequently applied for, is almost instantaneously available. In the case of a family proxy 17, not only the users' personal preferences but also the preferences of other users associated with the family proxy 17 are instantaneously available to all the users of a family. If applicable, a kind of parental or other management or supervision may be applied to the disclosure of the content of a family proxy to individual users.

Figure 3:
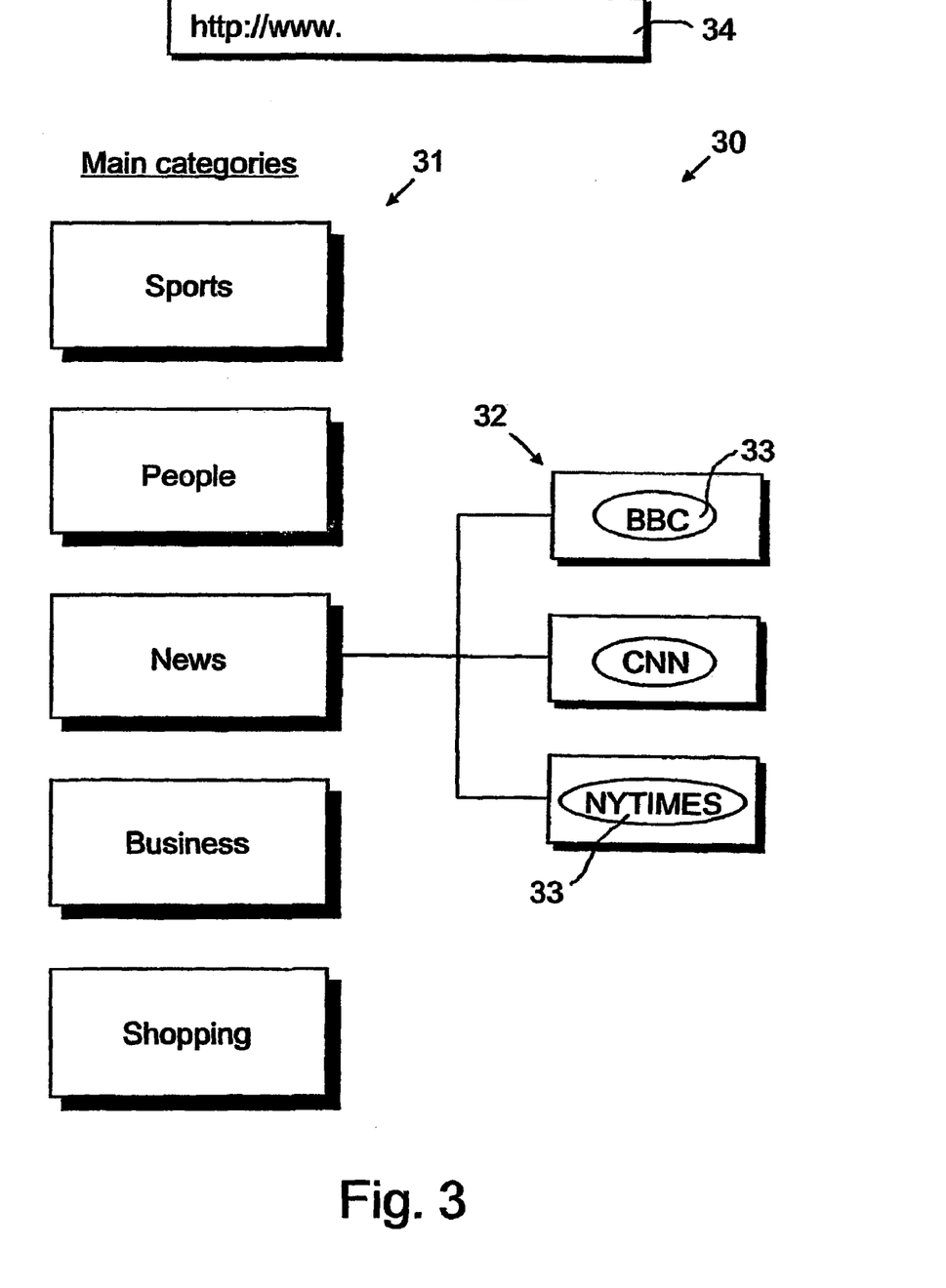
FIG. 3 is a schematic diagram showing a simplified embodiment of a navigation tree in accordance with the present invention.

In a preferred embodiment of the invention, the navigation tool 19 is present in the form of a navigation tree 30, as is schematically shown in FIG. 3. The navigation tree 30 in the embodiment shown comprises a first list 31 of data categories or main-categories, such as news, shopping, people, sports, and etc. Further, each data category may comprise a second list 32 of multi-level data pages also called top-level links. For example, the main-category "news" may comprise a second list of multi-level data pages referring to news stations like "BBC", "CNN", New York Times" and others. The main-category "sports" may refer to top-level pages providing sports news, etc. The top-level links may be further sub-divided into a third or fourth list etc., referring to particular sub-level pages, not shown.

By having the navigation tree user editable, each user may configure the navigation tree in order to fit optimally to his or hers interest profile or favorite data pages. In a preferred embodiment of the invention, the use of the navigation tree is made very comfortable in that the second list is comprised of icons 33 taking the form of an arbitrary part of a particular data page. The part of a data page forming the icon 33 can be arbitrarily selected by the user. Advantageously, a user can select any part of a data page which is best referring or appealing to a user in association with the relevant data page.

For requesting an arbitrary page on the WWW 1, the user may use the search field 34 of the navigation tree. Once displayed, the user may decide whether to incorporate the relevant page and page levels into his navigation tree 30, i.e. the second list 32 thereof by an appropriate icon 33. In a preferred embodiment, the user may also add or delete items of the first list 31 of main categories. It will be appreciated that such a navigation tree makes surfing of the Internet, for example, very attractive and easy and less complicated compared to currently available search engines on the Internet. In particular, if the navigation trees or part thereof of other users are made available or if suggestions are provided to a user for updating his or her navigation tree based on the pages and/or page levels retrieved by other users.

In order to enhance the speed by which data pages are displayed and to further simplify the navigation of the data network, user editable filters are provided for filtering the content of data page to be displayed. By applying filter tools, such as filters for modifying data pages in that graphics, colors, frames, background information or others are ignored, for example, display of page can be very much speeded up. Further, a user can be freed from unnecessary information enclosed by a data page. Such filters or page re-writing mechanisms may be prepared in advance and made available for incorporating into a navigation tool 19 of a user.

Likewise, filters designed by a user can be made available to all the users of the data network, in accordance with an embodiment of the invention, for incorporating in the navigation tool 19 of the individual users.

Filtering of the data pages is also applicable if the available display size is less than, for example, the standard 800×600 display. Such as is the case with present displays of mobile communication equipment, for which the method according to the present invention is very profitable.

In order to be able to filter and manipulate web content, firstly the response from a web server has to be split up into manageable and searchable components. Secondly, the filtering criteria have to be stored in a form that can be applied, on-demand, to the requested web page.

The document object model provides a useful way of accessing elements within a web page. By using standard "API" (Application Program Interface), either from "JAVA™" (Sun Microsystems of Santa Clara, Calif.) or even "VB 6" (Visual Basic 6), a document can be parsed and object model presented, whereby nodes or elements are made available programmatically. These nodes or elements can be read, removed or created as required. In this manner, an easy incorporation is possible into an application, which can add or remove elements.

One of the most useful tools in the construction of web filters is the text processing language. These can range from regular expression syntax and UKIX tools such as "awk" (interpreted programming language that is included in most versions of UNIX) and "sed", to higher level languages like "Lapis" (Lightweight Architecture for Processing Information Structure) and an integrated content processing platform "OMNIMARK®" (OmniMark is the registered trademarks of Stilo International plc. of Swindon, United Kingdom). Lapis is an example of a higher-level text processing language, making use of natural language syntax for the definition of "regions". Regions on a web page can be filtered, sorted and reformatted according to matches.

Wrapper refers to objects that perform filtering on a particular page, somewhat like a template.

Below, an example of a simple user editable navigation tool is presented. Any markup language based on closed non-overlapping tags can be represented as a tree.

EXAMPLE

In HTML

```
<html>
<head>
<title>A Simple HTML Example</title>
</head>
<body text="#000000" bgcolor="#FFFFFF" link="#3333CC"
vlink="#CC9900"alink="#336666">
<h1>HTML is Easy To Learn</h1>
<p>Welcome to the world of HTML. This is the first paragraph.
It is a shortparagraph!</p>
<p>And this is the second paragraph.</p>
<p align="center">And the third paragraph is centered.</p>
</body>
</html>
html—+—head—+—title
|
|—body—+—h1
+—p
+—p
+—p
```

The term closed means that every tag has a matching closing tag either explicit or implicit. Non-overlapping means that all enclosed tags must be closed before the closure of the containing tag.

EXAMPLE

INVALID: <h1><p></h1></p>

VALID: <h1><p></p></h1>

In the case of HTML this tree representation can be edited by pruning the tree. A pruning operation on a tree will remove a single pair of enclosing tags and all tags enclosed by them. On the tree this is the cutting of a branch and all connected branches further out on the branch. In principle, as in the case of HTML, where the tags do not dependently interact this will leave a valid document structure with the content of the deleted tags removed.

Dynamically (automatically) generated web pages are usually based on a fixed template where the changing content is only inserted at the deeper levels of the HTML structure. When applied to a web page which has changing content but has a static HTML structure for the first few levels (branching depth) this tree editing operation could be used as a filter. Since the pruning operation does not care about changes in the web page below the level of the pruning, the web page will still be intact except for the elements, which have been pruned.

An edit operation or collection of prunings can be stored as a tree structure on a computer. This stored filter only describes the tree to the depth of any cuts and can later be applied to a changed web page as long as the changes to that web page are below the depth of the filter. The user interface to such a pruner or filter constructor would allow the direct interaction with the tree and an immediate visual representation of the webpage as it is being pruned as feedback to the user.

The filter after storage can be applied on the user's computer or at an intermediate step in the transmission of the web page to the user, such as in a web proxy.

If the high level HTML of the web page is changed, as in a website redesign, the software which applies the filter can recognize the changes as a mismatch between the filter and the webpage and notify the filter maintainer.

The present invention provides a useful solution for enhancing the speed with which data pages of the WWW, for example, are displayed after being requested. With the navigation tool and personal or family proxy provided, there is much more direct access to favorite pages. Cluttered pages can be easily re-written or modified by suitable filters to fit to the users' interests. Suggestions as to new pages and filters for incorporation in the navigation tool can be provided, either especially written by an editorial board or the like and/or available from other users. The invention is particularly suitable for use with mobile or other equipment having limited display and information retrieval speed possibilities.

One skilled in the art will appreciate that the present invention can be practiced by other than the disclosed embodiments; these embodiments are solely presented for the purpose of explanation, and may not be construed as posing a limitation on the invention. The invention is defined by the following claims.

The invention claimed is:

1. A method for retrieving data from a data network, said network being of the type from which data can be retrieved, as multi-level data pages, from a plurality of data servers and by a plurality of users, said method comprising the steps of:

providing each of the users with an editable navigation tool for retrieving any of the data pages from said network;

establishing, for said each user, a personal proxy in a residential or local network gateway or a user station, said personal proxy having a cache memory, each of said users having a separate corresponding personal proxy thus forming a plurality of personal proxies associated with a group of said users;

storing, for said each user and in the personal proxy for said each user, one of the data pages and a corresponding data page level as accessed by said each user from the network and through use of the navigation tool;

subsequently retrieving, for said each user and through use of the navigation tool, any of the data pages and corresponding data page levels then stored in said personal proxy so as to define a retrieved data page and a retrieved corresponding data page level; and analyzing the retrieved data page and the corresponding retrieved data page level; and refreshing said personal proxy for said each user by accessing, from the network, recent versions of data pages and corresponding data page levels stored within the personal proxy and updating said data pages and said corresponding data page levels then stored in the personal proxy with said recent versions thereof; and wherein said analyzing step comprises the steps of:

analyzing data pages and data page levels previously retrieved for the group of users and stored within said plurality of personal proxies, said plurality of personal proxies forming a family proxy associated with all of said users in said group of users; and calculating an average level depth and a timing profile of each of the data pages then stored within the family proxy in response to a number of retrievals of said each stored data page from the family proxy; and wherein said refreshing step comprises the step of:

refreshing said each stored data page in the family proxy at a frequency responsive to the average level depth and the timing profile.

2. The method according to claim 1 wherein said navigation tool takes the form of a navigation tree.

3. The method according to claim 2, wherein said navigation tree comprises a first list of data categories and each data category comprises a second list of multi-level data pages, wherein said first and second list are user editable.

4. The method according to claim 3, wherein said second list comprises icons taking the form of an arbitrary part of a data page.

5. The method according to claim 4, comprising a user editable tool for filtering a data content of a data page to be displayed, including levels of said data page retrieved with the aid of said navigation tree.

6. The method according to claim 5, wherein said filter tool comprises at least one of a plurality of a group of filters including text filters, graphic filters, color filters, frame filters, background filters and page re-writing mechanisms.

7. The method according to claim 6, wherein for a data page and data page levels thereof predetermined filters are prepared and made available for incorporating into a navigation tree of a user.

8. The method according to claim 7, wherein said navigation tree and filters of a user are made available for incorporating into the navigation tree of another user.

9. The method according to claim 8, wherein said navigation trees and filters of users are analyzed as to the content of and frequency by which data pages and data page levels are retrieved, and suggestions are provided to individual users for enhancing or amending the content of their individual navigation tree based on said analysis.

10. The method according to claim 9, wherein for suggested data pages, at least two data page levels are stored in said cache memory.

11. The method according to claim 10, wherein, at a first start up for a user, a navigation tree is provided, based on certain characteristics of said user.

12. The method according to claim 9, wherein said navigation tool is provided by a network service provider.

13. A system arranged for operating in accordance with the method of claim 1 comprising a data network of the type from which data can be retrieved as multi-level data pages from a plurality of data servers and by a plurality of users, each of the users having a personal computer as the user station and arranged for connection to said data network and comprising the personal proxy having the cache memory.

14. The system according to claim 13, wherein said personal proxy is the family proxy.

15. A computer readable medium comprising a computer program having computer executable instructions stored thereon which, when executed by a computer, cause the computer to perform the method according to claim 1.

16. The method according to claim 1 wherein the refresh frequency for seldom retrieved data pages is less than the refresh frequency for frequently retrieved data pages.

17. The method according to claim 16 further comprising the step of refreshing said cache memory by:

randomly retrieving from said data network any of said data pages or data page levels then stored within the cache memory, and determining if information content of said any data page or said any data page level stored on the network has changed from that respectively then stored in the cache memory; and updating said any data page or said any data page level then stored in the cache memory with the corresponding data page and data page level then accessed from the network.

18. The method according to claim 17, wherein said storing, subsequently retrieving, analyzing and refreshing steps are performed or both said personal and family proxies.

19. The method according to claim 18, further comprising the step of suggesting data pages to another user.

20. The method according to claim 19, wherein the stored data pages are presented in the form of a navigation tree.

* * * * *